May 31, 1966  J. G. WARHOL  3,253,507
TWO PHASE ADJUSTABLE ANTI-GLARE REAR VISION MIRRORS
Filed April 6, 1962  2 Sheets-Sheet 1
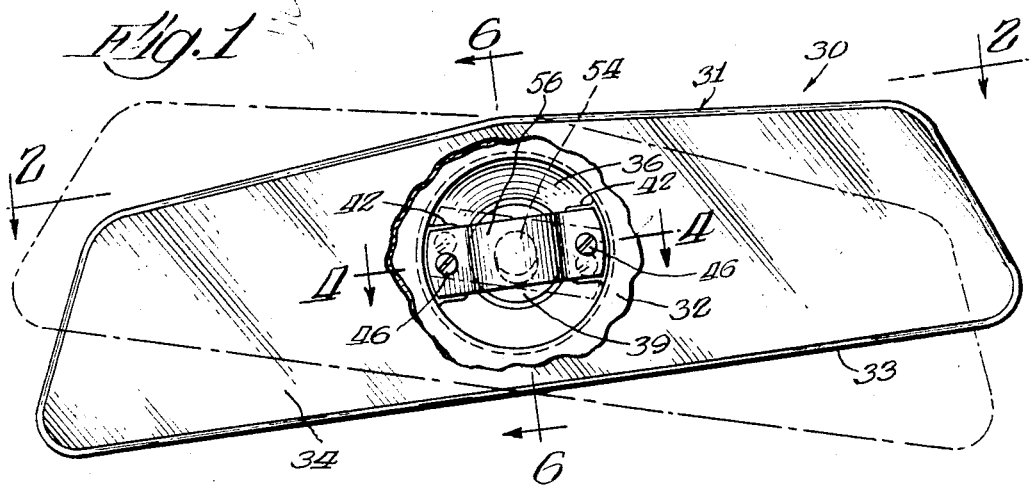
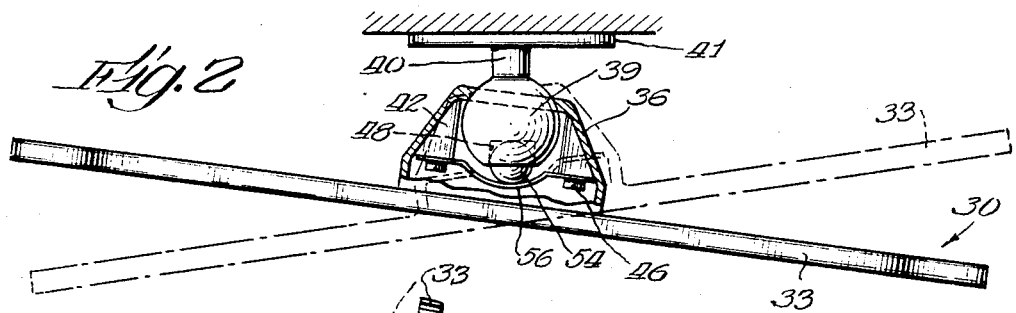
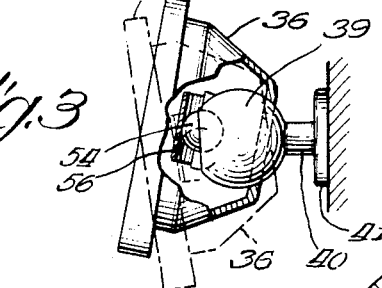
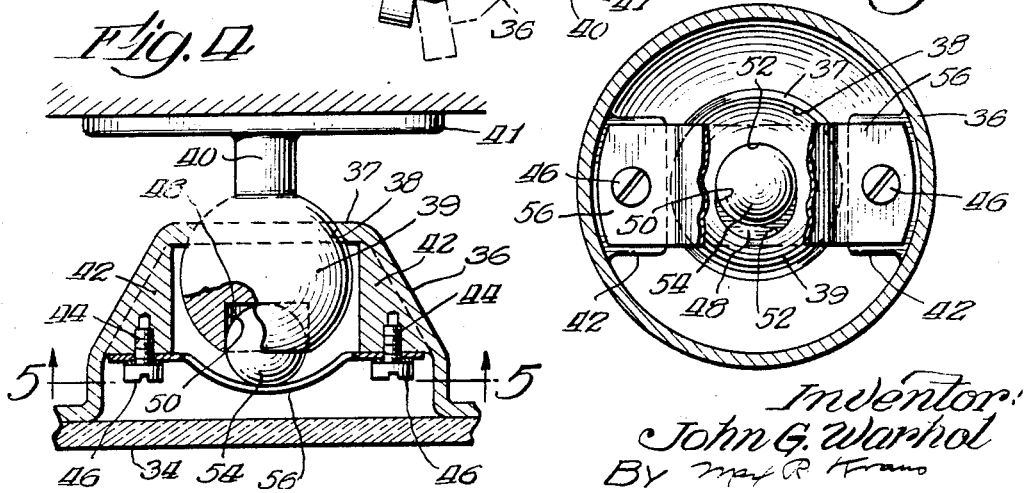
Inventor:
John G. Warhol

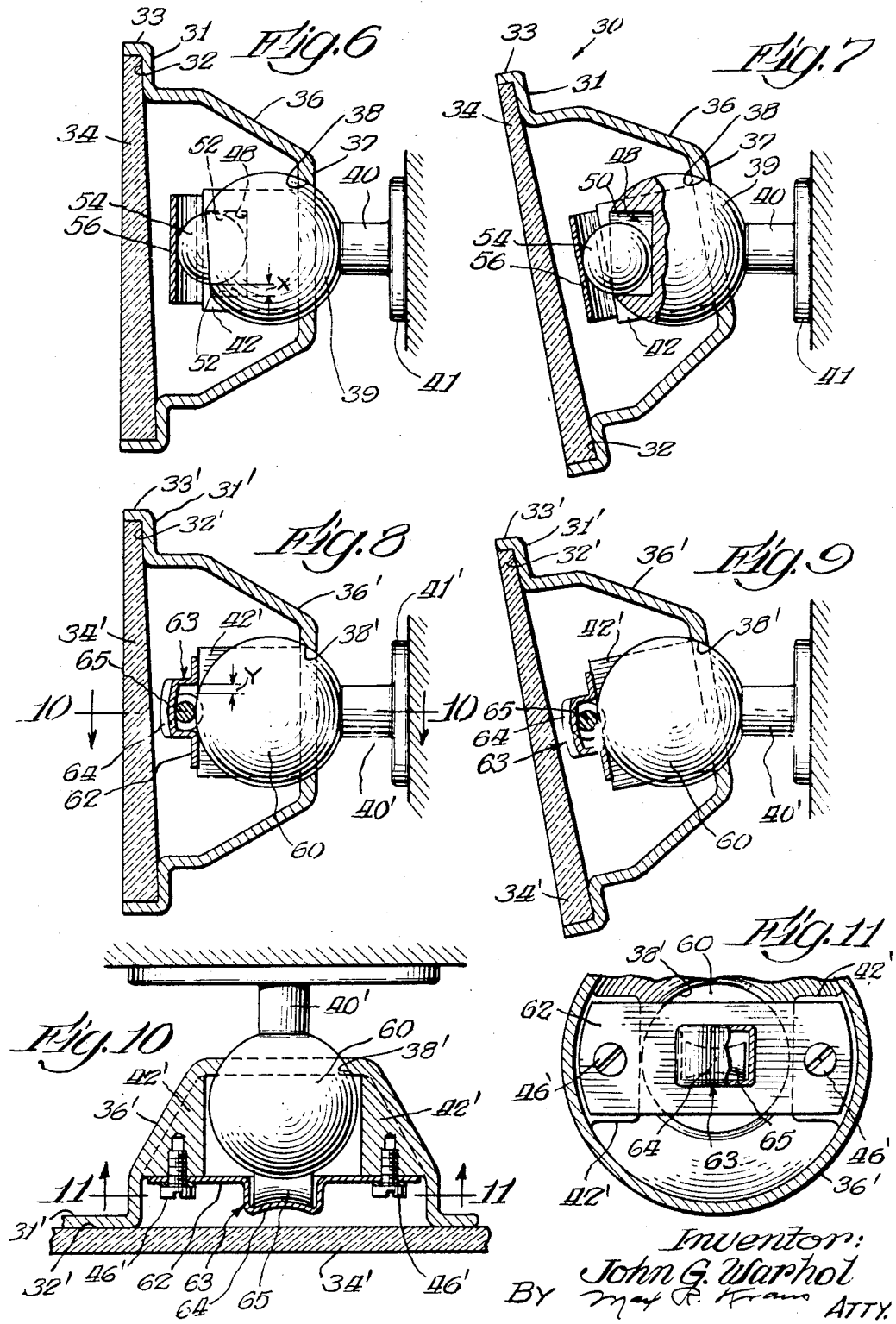

United States Patent Office 3,253,507
Patented May 31, 1966

3,253,507
TWO PHASE ADJUSTABLE ANTI-GLARE REAR VISION MIRRORS
John G. Warhol, Oak Park, Mich., assignor to Nelmor Corporation, Harper Woods, Mich., a corporation of Illinois
Filed Apr. 6, 1962, Ser. No. 185,560
8 Claims. (Cl. 88—77)

This invention relates to an adjustable anti-glare rear vision mirror, and more particularly to a rear vision mirror adapted for both day and night driving.

One of the objects of this invention is to provide a rear vision mirror in which the mirror unit as a whole is adjustable to an angle and level as to properly reflect the view from the rear window of the car to the eyes of the driver, which may be termed as the first phase adjustment, and wherein the mirror unit is also adjustable to either of two selective positions to observe images of different intensity, which may be termed as the second phase adjustment, both the first and second phase adjustments being effected solely by manual force applied to the mirror unit.

Rear view mirrors common in the art and on the market are adjustable as a whole and are also adjustable to either of two selective positions, however, such mirrors require the use of levers, rotatable members or the like for effecting adjustment to the two selective positions. With this invention, levers and other auxiliary manually engaged means for selectively adjusting the mirror to two different positions for reflecting images of different intensity are eliminated and in accordance with this invention there is provided a mirror unit which is adjustable in the first phase and in the second phase merely by the application of manual force applied directly to the mirror unit, as by a person's hand engaging the mirror unit. The force necessary for pivoting the mirror unit in the second phase to either of the two selective positions is very insignificant, in the order of three pounds per square inch, whereas the manual force or pressure for the adjustment of the mirror unit as a whole in the first phase requires a manual force of approximately ten pounds per square inch.

Another object of this invention is to provide an adjustable anti-glare rear vision mirror in which the mirror unit as a whole may be adjusted merely by the application of a certain amount of manual pressure applied against the mirror unit, which adjustment remains fixed until such time as again readjusted by the same amount of manual pressure, and wherein the mirror unit may also be adjusted to two limited selective positions principally for reflecting the intensity of the image, the more limited adjustment between the two selective positions being effected by a manual pressure on said mirror unit less than that necessary to effect the adjustment of the mirror unit as a whole.

Another object of this invention is to provide an anti-glare rear vision mirror which has two independent and separate phases of adjustment, both accomplished by manual pressure on the mirror unit, the first phase of adjustment being effected by a greater degree of manual pressure on the unit wherein the mirror unit as a whole is adjusted to the proper angle and level of the vision of the driver, and the second phase of adjustment wherein the mirror unit is flipped back and forth manually to either of two selective positions by the application of a very minimal amount of manual pressure on said mirror unit, all being effected without the use of any levers or other extraneous operating elements.

Another object of this invention is to provide a rear vision mirror of the foregoing character which is economical to produce, which is very attractive in appearance and which is readily operable merely by the application of manual pressure on the unit.

Other objects and advantages will become apparent as this description progresses.

In the drawings:

FIGURE 1 is a front elevational view with a portion of the mirror reflector broken away to show a portion of the interior.

FIGURE 2 is a view partly in section taken on lines 2—2 of FIGURE 1. The dotted lines in FIGURES 1 and 2 show an adjustment of the mirror unit as a whole.

FIGURE 3 is a side elevational view partly in section of said mirror unit and showing in dotted lines the adjustment of the mirror unit as a whole.

FIGURE 4 is a view taken on lines 4—4 of FIGURE 1.

FIGURE 5 is a view taken on lines 5—5 of FIGURE 4.

FIGURE 6 is a view taken on lines 6—6 of FIGURE 1, showing the reflective mirror unit in one of its two selective positions.

FIGURE 7 is a view similar to FIGURE 6 but with the mirror unit tilted and showing the other selective positions.

FIGURES 8 to 11 inclusive show a modification in which:

FIGURE 8 is a view of said modification taken on lines similar to FIGURE 6;

FIGURE 9 is a view similar to FIGURE 8 with the mirror unit tilted;

FIGURE 10 is a view taken on lines 10—10 of FIGURE 8, and

FIGURE 11 is a view taken on lines 11—11 of FIGURE 10.

Reference will now be made to FIGURES 1 to 7 inclusive.

The mirror assembly or mirror unit generally indicated at 30 comprises a generally rectangular-shaped supporting plate 31 having a flat wall surface 32 bounded by a forwardly extending lip or flange 33 in which is seated a prismatic reflective mirror generally indicated at 34.

Extending rearwardly of the supporting plate 31, and preferably formed integrally therewith, is a rearwardly offset portion which forms the housing 36 for certain of the parts. The rear wall 37 of the housing 36 is provided with a central opening 38 which forms a socket opening to accommodate a spherical-shaped member 39 which is supported on a fixed arm or stem 40 secured to a bracket 41 attached to an automobile, as is well known.

The interior of the housing 36 is provided with spaced bosses 42, each of which has a threaded opening 44 to receive threaded elements 46 or the like for the purpose of retaining a spring member across the front of the spherical member 39. The spring member may be secured by any other means, such as pinning, staking or the like. The front of the spherical-shaped member 39 is provided with a rectangular-shaped recess 48 having spaced flat side walls 50 and spaced flat top and bottom walls 52.

A ball-shaped bearing 54 is supported within said rectangular-shaped recess 48 and extends forwardly thereof and is engaged by a spring 56 which is secured to the housing section, as previously described. The spring 56 provides a pressure contact with said bearing 54. The spring 56 is provided with a concave recess having a radius different than the radius of the ball-bearing 54.

The height of the rectangular recess 48, that is, the distance between the top and bottom walls 52 is greater than the diameter of the ball bearing 54, and the width, that is, the distance between the side walls 50 is just sufficient to allow the ball bearing to roll vertically in the recess without any appreciable lateral play. The friction between the spring 56 and the ball bearing 54 is considerably greater than the friction between the ball bearing 54 and the wall surface of the recess 48 in which it is contained. Thus, a slight manual pressure of approximately three p.s.i. on the mirror unit 30 will cause the ball bearing 54 to roll within the rectangular recess 48 and the ball bearing will be capable of movement in a vertical direction, the distance defined by the space X in FIGURE 6.

With the mirror unit in the position shown in FIGURE 6, a slight downward pressure as aforesaid on the mirror unit will cause the ball bearing 54 to roll in the recess 48 downwardly from the FIGURE 6 to the FIGURE 7 position. As the ball bearing moves downwardly it does not change its position relative to the spring 56 but the spring moves downwardly with the bearing 54. Simultaneously, the housing 36, plate 31 and prismatic mirror 34 move downwardly as a unit, thereby changing the reflective position of the mirror 34.

A slight manual upward pressure on the lower side of the mirror unit in FIGURE 7 will raise it to the FIGURE 6 position as the ball bearing 54 rolls up from its lower position in the recess 48 to its uppermost position as in FIGURE 6. The degree of tilt or angular change is always fixed and defined by the movement of the ball bearing 54 in the recess 48 and is indicated by the letter X in FIGURE 6. With a slight manual pressure the mirror unit is flipped to either of its two selective positions to reflect to an observer images of different intensity. This will sometimes be identified as a second phase adjustment.

To adjust the mirror as a whole to such an angle as to properly reflect the view from the rear window of the automobile to the eyes of an observer and also the level of the mirror, the casing 36, support plate 31, prismatic mirror 34 and spring 56 will be moved as a unit relative to the ball bearing 54 (rather than with it as previously described). To accomplish this, a greater manual pressure of approximately ten p.s.i. is necessary to be applied to the mirror unit 30 to overcome the friction between the spring 56 and the ball bearing 54, and this will permit movement of the spring 56 relative to the ball bearing 54.

The adjustment of the mirror unit as a whole will sometimes be referred to as a first phase adjustment, since the mirror unit is first adjusted by the driver for his particular vision and remains in that position throughout, while the flipping of the prismatic mirror takes place subsequently several times during each trip.

The embodiments shown in FIGURES 8 to 11 inclusive will now be described.

The supporting plate, prismatic mirror, casing, supporting arm, common to the first embodiment will not be redescribed. The parts common to both will be identified by the same numerals primed.

In this embodiment a spherical-shaped member 60 is secured to the arm 40' and extends within the housing 36' and through the socket opening 38'. The spring 62 is secured by fastening members 46' to the bosses 42' of the housing and said spring is provided with a forwardly extending offset portion which defines a rectangular-shaped housing 63, the front wall 64 of which is concavely shaped, as best seen in FIGURE 10. The spring may be secured by any other means, such as pinning, staking, and the like.

Supported within the housing 63 and front wall 64 is a concave roller 65 which engages the spherical member 60 and is adapted to move vertically relative thereto to the extent permitted by the difference in the height between the housing 63 and the roller 65, which is identified by the letter Y in FIGURE 8.

The friction between the spring 62 and the concave roller 65 when in locked position relative to the spherical member 60 is considerably greater than the rolling friction between the concave roller 65 and the spherical member 60, thus a slight manual pressure of approximately three p.s.i. on the mirror unit 30 will cause the concave roller 65 to roll within the housing 63 on the spherical member 60 and the concave roller 65 will be capable of movement in a vertical direction, the distance defined by the space Y in FIGURE 8. With the mirror unit in the position shown in FIGURE 8, a slight downward manual pressure on the mirror unit will cause the concave roller 65 to roll in the recess upwardly on the spherical member 60, from the FIGURE 8 to the FIGURE 9 position. As the concave roller moves upwardly relative to the stationary spherical member 60, the housing 36', plate 31', prismatic mirror 34', and spring 62 move as a single unit downwardly to the position shown in FIGURE 9, thereby changing the reflective position of the prismatic mirror 34. A slight manual upward pressure on the lower side of the mirror unit will reverse the procedure and tilt the unit back to the FIGURE 8 position. This procedure changes the mirror to either of two selective positions to reflect images of different intensities. This is identified herein as the second phase adjustment.

To adjust the mirror as a whole it is necessary to move the spring 62 and concave roller 65 as a unit relative to the spherical member 60 and this is accomplished by applying a greater manual pressure of approximately ten p.s.i. on the mirror unit 30' to overcome the friction between the spring 62 and the concave roller 65 which locks and binds within the housing 63 after it has reached either its upward or downward rolling movement. This greater manual pressure will cause a change in the fixed relative position between the spring 62 and spherical member 60, and since the spring 62 is secured to the plate 31', housing 36', and prismatic mirror 34', the fixed adjusted position of same is changed. This is identified as the first phase adjustment.

It will be observed that with respect to the embodiments here illustrated, the pivoting or flipping of the mirror unit to either of its two selective positions for reflecting images of different intensities does not effect the first phase adjustment.

It will be understood that various changes and modifications may be made from the foregoing without departing from the spirit and scope of the appended claims.

What is claimed is:

1. An adjustable anti-glare rear vision mirror comprising a mirror unit including a reflective mirror, a support member to which said reflective mirror is fixedly secured and a housing all movable as a unit, a stem secured to an automobile or the like, a spherical-shaped member secured to said stem and extending into said housing, a spring anchored to said housing to move with said housing and extending across the front of said spherical member, roller means between said spherical member and said spring and engaged by said spring and said spherical member and movable relative to said spherical member to permit adjustment of said mirror unit with respect to said spherical member, said mirror unit being adjustable through two separate and independent phases of adjustment, the first phase of adjustment being between said housing and said spherical member and the second phase of adjustment is where the mirror unit is adjustable to one of two selective positions for the purpose of providing reflective images of different intensities, wherein the roller moves relative to the spherical shaped member.

2. An adjustable anti-glare rear vision mirror comprising a mirror unit including, a reflective mirror, a support member to which said reflective mirror is fixedly secured and a housing all movable as a unit, a stem secured to an automobile or the like, a spherical-shaped member secured to said stem and extending into said housing, a flat-shaped spring secured to said housing to move with said housing and extending across the front of said spherical member, means between said spherical member and said spring and engaged by said spherical member and said spring and movable relative to said spherical member to permit adjustment of said mirror unit with respect to said spherical member, said mirror unit being adjustable through two separate and independent phases of adjustment, the second phase of adjustment being effected by a manual force against said mirror unit whereby said mirror unit including said spring member moves so that said means between said spring and spherical member moves relative to said spherical member through a limited phase between two selective positions for the purpose of providing reflected images of different intensities, said mirror unit adapted to be adjustable in a first phase of adjustment whereby the application of a greater manual force will cause said mirror unit and said spring to move relative to said means between the spring and the spherical member.

3. In a structure defined in claim 1 in which the spherical member has a recess at the front thereof and the means comprises a ball-shaped member movable within said recess and engageable by said spring.

4. In a structure defined in claim 1 in which the means comprises a concave roller in engagement with the front of said spherical member and also in engagement with said spring whereby said concave roller moves relative to said spring and within said spring.

5. An adjustable anti-glare rear vision mirror comprising a mirror unit which includes a reflective mirror, a support to which said mirror is fixedly secured and a casing whereby said mirror, support and casing move together as a unit, a stem having means for securement to an automobile or the like, means within said casing for supporting the mirror unit for two separate phases of adjustment by the application of manual force applied against the mirror unit for the purpose of providing reflective images of different intensities, said means including a generally spherical-shaped member mounted on said stem and extending within said casing, a roller member supported on said spherical member, a single spring member within said casing and secured thereto to move with said casing, said spring member engaging said roller member, said single spring member acting to control the two separate phases of adjustment of said mirror unit, said single spring member applying a friction sufficient to maintain the mirror unit as a whole in a first phase adjusted position whereby said mirror unit may be adjusted as a whole to such an angle and level as to properly reflect the view from the rear of an automobile by the application of a manual force applied against the mirror unit, said single spring member controlling the friction of the second phase adjustment, namely, said roller moving on said spherical member between two selective positions by the application of manual force applied to the mirror unit without disturbing the first phase adjusted position, said movement between two selective positions being effected by a lesser manual force than the force necessary to effect the first phase adjustment.

6. A structure defined in claim 5 in which the spherical member has a recess for accommodating the roller.

7. A structure defined in claim 6 in which the roller is a ball bearing.

8. A structure defined in claim 5 in which the roller has a concave engaging surface engaging the spherical member and the spring member.

References Cited by the Examiner
UNITED STATES PATENTS 2,616,335  11/1952  Mazur _____ 88—98

FOREIGN PATENTS 966,197  7/1957  Germany.

JEWELL H. PEDERSEN, *Primary Examiner.*

J. K. CORBIN, *Assistant Examiner.*